United States Patent
Johnson et al.

(10) Patent No.: US 9,391,946 B2
(45) Date of Patent: *Jul. 12, 2016

(54) SYSTEM AND METHOD FOR ENABLING IDENTIFICATION OF NETWORK USERS HAVING SIMILAR INTERESTS AND FACILITATING COMMUNICATION BETWEEN THEM

(71) Applicant: Aaron Q. Johnson, Zurich (CH)

(72) Inventors: Aaron Q. Johnson, Zurich (CH); Scott J. Brickner, Alexandria, VA (US)

(73) Assignee: Aaron Q. Johnson, Zurich (CH)

( * ) Notice: Subject to any disclaimer, the term of this patent is extended or adjusted under 35 U.S.C. 154(b) by 25 days.

This patent is subject to a terminal disclaimer.

(21) Appl. No.: 14/059,052

(22) Filed: Oct. 21, 2013

(65) Prior Publication Data

US 2014/0059136 A1 Feb. 27, 2014

Related U.S. Application Data

(63) Continuation of application No. 10/800,742, filed on Mar. 16, 2004, now Pat. No. 8,566,422.

(51) Int. Cl.
| | |
|---|---|
| *G06F 15/16* | (2006.01) |
| *H04L 12/58* | (2006.01) |
| *G06Q 30/02* | (2012.01) |
| *H04L 29/08* | (2006.01) |

(52) U.S. Cl.
CPC ............... *H04L 51/32* (2013.01); *G06Q 30/02* (2013.01); *H04L 67/20* (2013.01); *H04L 67/22* (2013.01); *H04L 67/306* (2013.01); *H04L 67/34* (2013.01); *H04L 67/36* (2013.01)

(58) Field of Classification Search
CPC ......... H04L 51/32; H04L 67/20; H04L 67/22; H04L 67/306; H04L 67/36; G06Q 30/02
See application file for complete search history.

(56) References Cited

U.S. PATENT DOCUMENTS

| | | |
|---|---|---|
| 6,629,097 B1 | 9/2003 | Keith |
| 7,035,926 B1 | 4/2006 | Cohen et al. |
| 2001/0016825 A1 | 8/2001 | Pugliese et al. |
| 2001/0027474 A1 | 10/2001 | Nachman et al. |
| 2001/0038624 A1 | 11/2001 | Greenberg et al. |
| 2002/0026498 A1 | 2/2002 | Kim |

(Continued)

FOREIGN PATENT DOCUMENTS

WO    WO 03/107138 A2    12/2003

OTHER PUBLICATIONS

Pekkola et al., "Meeting others—supporting situation awareness on the WWW", University of Jyvaskyla. Elsevier Science B.B. 2001.

*Primary Examiner* — William Goodchild
(74) *Attorney, Agent, or Firm* — Mintz Levin Cohn Ferris Glovsky and Popeo, P.C.

(57) ABSTRACT

A system and method is provided for enabling identification of network users having similar interests and for facilitating communication between them. An Internet-based (or "online") application is provided that: 1) facilitates the identification of users having similar interests using web-browsing behavior; 2) determines the virtual distance between web sites; and 3) utilizes profiling techniques and user-supplied descriptive information to facilitate direct communication between users who need not have had prior contact, and without requiring the participation of the visited web sites.

29 Claims, 7 Drawing Sheets

(56) References Cited

U.S. PATENT DOCUMENTS

| | | |
|---|---|---|
| 2002/0059192 A1 | 5/2002 | Ling |
| 2002/0123988 A1 | 9/2002 | Dean et al. |
| 2003/0018747 A1 | 1/2003 | Herland et al. |
| 2003/0112948 A1 | 6/2003 | Brown et al. |
| 2003/0112952 A1 | 6/2003 | Brown et al. |
| 2003/0158855 A1 | 8/2003 | Farnham et al. |
| 2004/0034706 A1 | 2/2004 | Cohen et al. |
| 2004/0049732 A1 | 3/2004 | Wicks |
| 2005/0141688 A1 | 6/2005 | Wengrovitz |

User's current location http://www.companyxyz.com/management.html

| USER | Current URI | Distance |
|---|---|---|
| 1 | http://www.companyxyz.com/ | 001.000000 |
| 2 | http://www.companyxyz.com/manage.html | 000.0078125 |
| 3 | http://www.companyxyz.com/products/widget1.html | 001.000000 |
| 4 | ftp://spaceagency.gov/telescope1024.jpg | 100.000000 |
| 5 | ftp://spaceagency.gov/stars/blue/images/bluestar10.jpg | 100.000000 |
| 6 | http://www.companyxyz.com/management.html | 0.0000000 |
| 7 | http://pds.jpl.nasa.gov/planets/welcome/mars.htm | 050.00000 |

FIG. 6

SYSTEM AND METHOD FOR ENABLING IDENTIFICATION OF NETWORK USERS HAVING SIMILAR INTERESTS AND FACILITATING COMMUNICATION BETWEEN THEM

CROSS-REFERENCE TO RELATED APPLICATION

This application is a Continuation of U.S. patent application Ser. No. 10/800,742, filed on Mar. 16, 2004, now U.S. Pat. No. 8,566,422 issuing on Oct. 22, 2013, the contents of which are hereby incorporated by reference in their entireties.

FIELD OF THE INVENTION

The invention relates generally to computer networks, and more particularly to a computer network-based application that facilitates communication between network users with similar interests that may not have had prior contact. The system and method of the invention identifies common elements between current, real-time, and historical behavior of users that may imply common interests, and facilitates direct communication between them.

BACKGROUND OF THE INVENTION

Internet communications applications such as, for example, e-mail, instant-messaging, telephony (voice over IP, or VoIP), or e-commerce require users to exchange contact information prior to initiating communication or enabling commerce transactions between the users. To communicate via instant-messaging, for example, a first user is typically required to know the "screen name" of an intended recipient. Exceptions to this include community-based or topic-oriented applications, such as newsgroups, chat boards, membership websites, or hobby websites, where communication amongst users may be controlled by the particular application. On the Internet, users who do not know one another, but who may have reason to communicate, may be limited by two main factors: 1) the availability of contact information for those with whom they wish to communicate or exchange payment; and 2) the capabilities of an application (e.g., a website), such as whether the provider permits communication or the exchange of payment among users utilizing the application. As an example, users visiting the same web page have at least a common interest in the content of that page, yet they normally have no way of discovering this, nor do they have means for communicating with other users. To identify and/or communicate with users having similar interests, a user must know such persons in advance or rely on a facility provided by the application (i.e., the website).

These and other drawbacks exist with existing systems.

SUMMARY OF THE INVENTION

The invention solving these and other problems relates to a system and method for enabling identification of network users having similar interests and for facilitating communication between them. According to an embodiment of the invention, an Internet-based (or "on-line") application is provided that: 1) facilitates the identification of users having similar interests using web-browsing behavior; 2) determines the virtual distance between web sites; and 3) utilizes profiling techniques and user-supplied descriptive information to facilitate direct communication between users who need not have had prior contact, and without requiring the participation of the visited web sites.

According to one aspect of the invention, users may register and receive a software download. The download may comprise, for example, a browser plug-in. The software, in conjunction with the on-line application may determine and display to the user a list of other registered users who are presently visiting the same web page as the user, or who are presently visiting web pages that are conceptually "near" the web site or web page. The determination of nearness, as further detailed below, is based on a synthetic distance metric artificially imposed on the space of all Uniform Resource Identifiers (URIs) by the on-line application.

Additionally, users may filter, sort, or otherwise manipulate the display of listed users based on profile or other information to aid in prioritizing and selecting individuals for purposes of communication.

According to one aspect of the invention, a user may communicate with selected individuals or groups via instant-messaging systems, Internet telephony, asynchronous messaging systems (e.g., e-mail, voice-mail, etc), or other known communication systems. The exchange of money or other compensation (such as frequent flyer miles or affinity program points) between users is also enabled.

As one example, if a user is visiting the web site at www.espn.com, it is likely that the user and other visitors to that site share a common interest in sports. However, there are many types of sports. Accordingly, if a user is particularly interested in skiing, the user may visit a page at the ESPN site having the URI http://www.espn.com/skiing, while another user with an interest in football may visit http://www.espn.com/football. The site may provide even more specific pages, such as http://www.espn.com/skiing/downhill and http://www.espn.com/skiing/crosscountry. The invention, as described in greater detail below, may assign the latter two URIs a smaller virtual distance than it will the general skiing and football pages.

A user may receive and view a list of other registered users who are presently visiting (or who have recently visited) the skiing page. The user may then look at profile information associated with the listed users to determine, as one example, which users, if any, reside geographically near the user. The user may then choose to contact one of these users to discuss a local skiing issue such as, for example, conditions at a local ski slope, location of a good local ski shop, etc.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 6 is an exemplary illustration of data table, according to an embodiment of the invention.

DETAILED DESCRIPTION OF PREFERRED EMBODIMENTS

Figure 1:
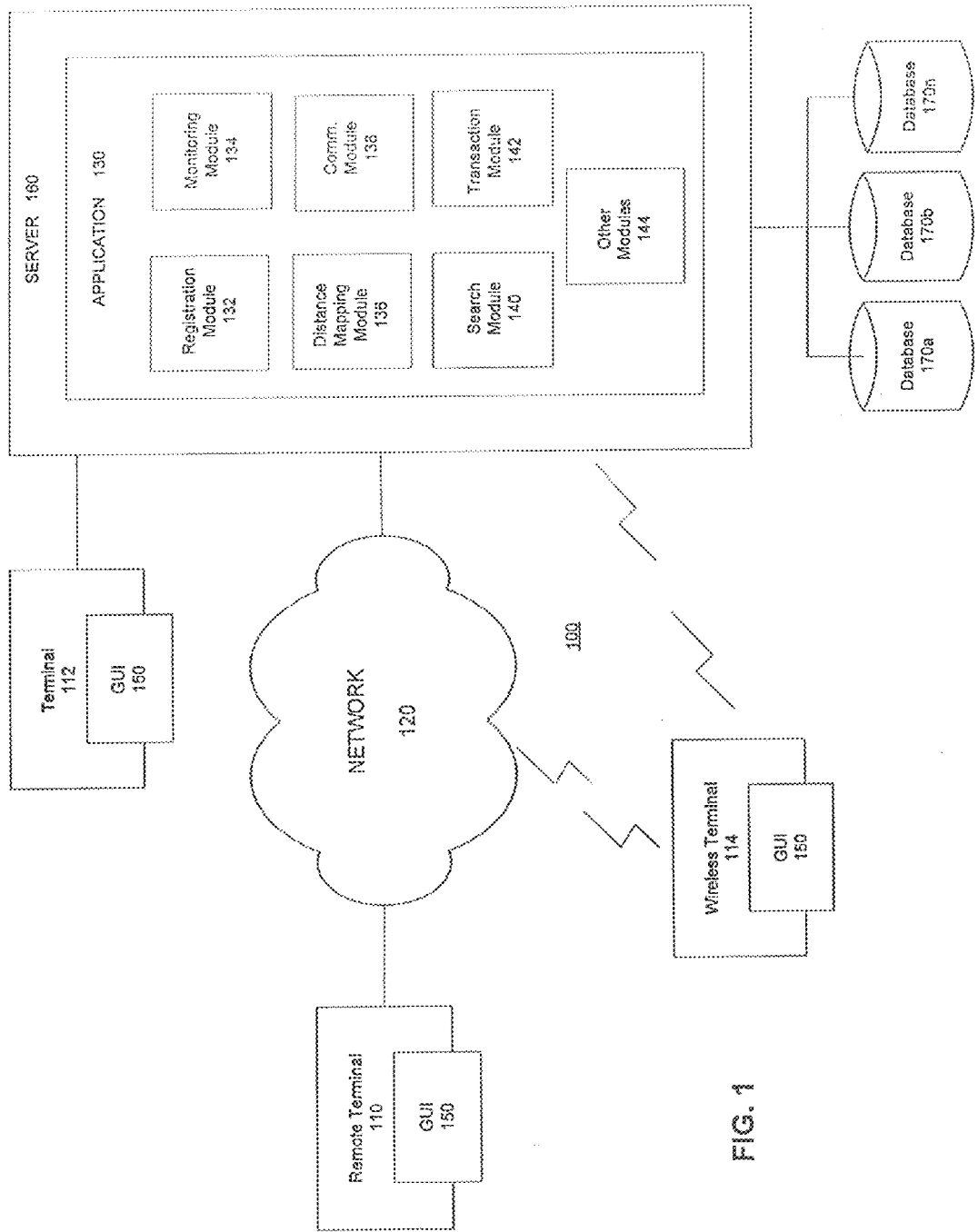
FIG. 1 is a schematic diagram of a system for enabling identification of network users having similar interests and for facilitating communication between them, according to an embodiment of the invention.

According to an embodiment of the invention illustrated in FIG. 1, a system 100 is provided for enabling identification of network users having similar interests and facilitating communication between them. System 100 may include a server 160 which may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

According to an embodiment of the invention, server 160 may host an application 130. Application 130 may comprise an Internet web site, an intranet site, or other host site or application maintained by a service provider, or other entity. Application 130 may be accessed by any number of users in a variety of manners (described below) for a variety of reasons.

According to an embodiment of the invention, application 130 may comprise a registration module 132, monitoring module 134, distance mapping module 136, communications module 138, search module 140, transaction module 142, or other modules 144, each of which may implement the various features and functions (as described herein) that aid in enabling identification of network users having similar interests and facilitating communication between them. One or more of the modules comprising application 130 may be combined. For some purposes, not all modules may be necessary.

In operation, one or more users may access server 160 and application 130 through an interface. By way of example, server 160 may comprise a web server and the interface may comprise a web browser. Those having skill in the art will recognize that other client/server and network configurations may be used.

According to an embodiment, the interface may comprise a graphical user interface (GUI) 150. The GUI 150 may be displayed via a terminal 112, such as a personal computer, workstation, dumb terminal, or other user terminal networked directly to server 160.

A user may also access server 160 through GUI 150 displayed on a remote terminal 110. Remote terminal 110 may be connected to server 160 over a network 120, via a communications link. Network 120 may include any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection.

Additionally, users may also access server 160 through GUI 150 displayed on a wireless terminal 114, such as a portable computer, personal digital assistant (PDA), wireless phone, Web-enabled mobile phone, WAP device, web-to-voice device, or other wireless device.

According to an embodiment of the invention, one or more databases (170a, 170b . . . 170n) may be operatively connected to server 160. Databases (170a, 170b . . . 170n) may be, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Query Language), a SAN (Storage Area Network), Microsoft Access™ or others may also be used, incorporated, or accessed into the invention.

Those having skill in the art will appreciate that the invention described herein may work with various system configurations. Accordingly, more or less of the aforementioned system components may be used and/or combined in various embodiments.

As an exemplary illustration, according to one embodiment, network 120 may comprise the Internet, GUI 150 may comprise a web browser, and one or more users may use any known terminal device (e.g., terminals 110, 112, 114, etc.) to browse the World-Wide Web (WWW).

According to an embodiment of the invention, a user wishing to identify and communicate with other Internet users having similar interests (and exploit the other features and functionality of the invention) may access application 130 and complete a registration process. According to one embodiment, registration module 132 may enable a user to establish a user account and create one or more identities (or "handles") by which they may be identified to other users. The handles may comprise real or fictitious names, or comprise any number of characters and/or symbols by which a user may choose to be identified to other users. The terms "users," "handles," "identities," and/or "screen names" may be used interchangeably herein.

According to an embodiment of the invention, each handle may have an associated profile which includes other information provided by the individual such as, for example, contact information, education information, profession, publications, likes, dislikes, credit-card or other financial information, preferred retailers, interests, hobbies, books read, pets, demographic information, etc. A user may have more than one handle but, in certain embodiments, only one handle may be active in any given browser session. An administrator having appropriate access rights and/or the user may modify the contents of the profiles associated with his handles at any time. According to an embodiment of the invention, and with reference to FIG. 3, profile information for one or more users may be stored in data tables or records associated with the one or more databases (170a, 170b . . . 170n) illustrated in FIG. 1.

Figure 3:
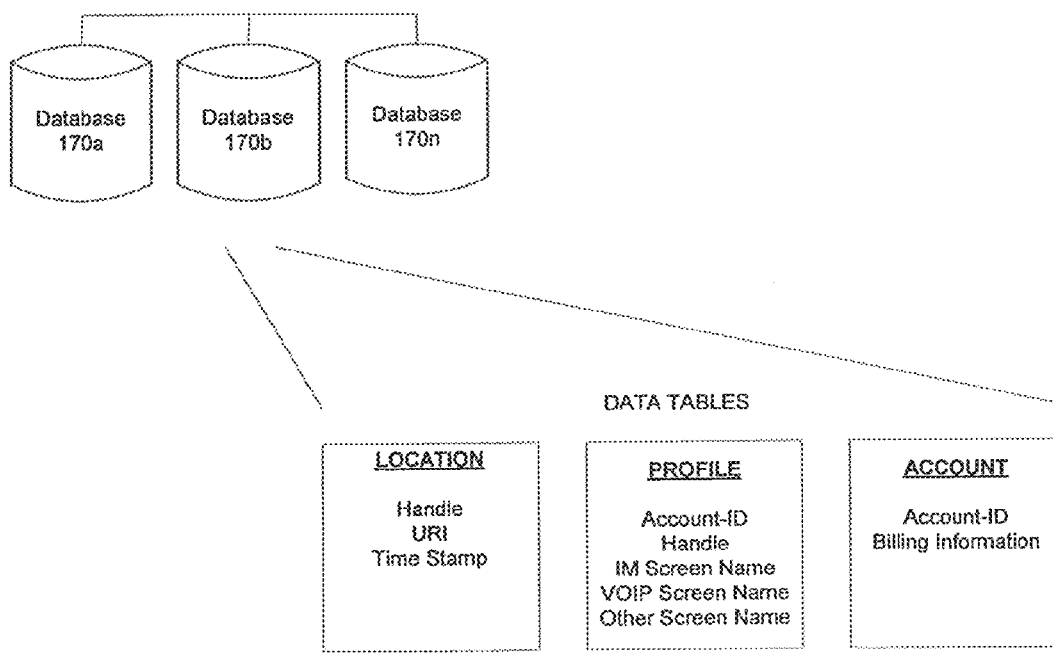
FIG. 3 illustrates one or more data tables or data records, according to an embodiment of the invention.

According to one implementation, a user may be charged a fee to register with application 130. As shown in FIG. 3, account information for one or more registered users may be stored in data tables or records associated with the one or more databases (170a, 170b . . . 170n) illustrated in FIG. 1.

According to an embodiment of the invention, during registration, a software download (e.g., a browser plug-in) may be downloaded to the user's terminal (e.g., terminal 110, 112, 114) thus enabling the user's terminal to interface with and/or act as an agent of application 130, as known and understood by those having skill in the art. In an alternative embodiment, a user may manually install software on his/her terminal from any computer readable media (e.g., diskette, CD-ROM, etc.)

provided by a service provider or other entity. The software or software download may enable away or all of the features or functionality afforded by registration module 132, monitoring module 134, distance mapping module 136, communications module 138, search module 140, transaction module 142, or any other module associated with application 130. In still yet another embodiment, a user may log-on to application 130 which may govern each browsing session, thus eliminating the need for software to be installed on the user's terminal. Other implementations may exist.

Figure 2:
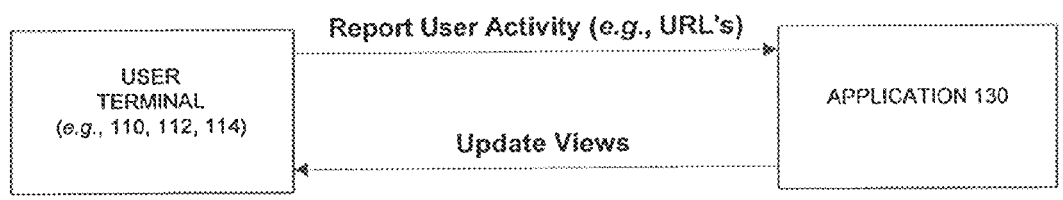
FIG. 2 is a schematic diagram illustrating a flow of data according to the invention, in one regard.

According to one implementation as illustrated in FIG. 2, and described in greater detail below, each time a registered user browses to a new web page, the software download (or browser plug-in) loaded on the user's terminal may transmit the Uniform Resource Locator (URL) address of the current web page (or other information) to monitoring module 134 of application 130. This "location" information may also be stored in one or more data tables or records associated with one or more databases (170a, 170b ... 170n) as shown in FIGS. 1 and 3. For example, URLs of web pages recently visited by users and the times that the URL's were visited may be stored.

Distance mapping module 136 may then, based on the information received by monitoring module 134, re-compute the user's view of a virtual space and transmit the updated view to the user's terminal to be displayed to the user via the web browser (GUI 150). In particular, distance mapping module 136 may compute the location's virtual distance from the locations of one or more other registered users, selecting those users at locations with a virtual distance less than a configured threshold to be included in the response. The configured threshold may also be referred to herein as a user-defined "viewable distance." In various embodiments, the configured threshold may be modified by an administrator having appropriate access rights, in addition to the user.

Figure 4:
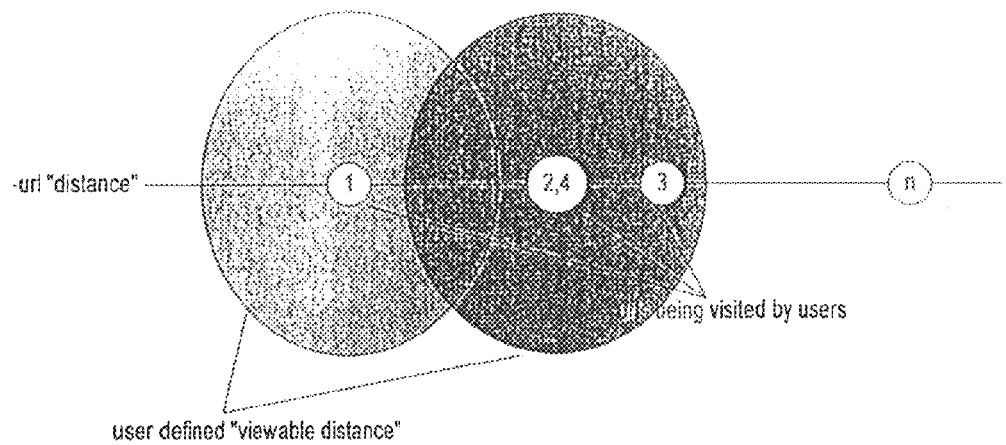
FIG. 4 depicts a graphical representation of viewable or virtual distances between users, according to an embodiment of the invention.
Figure 5:
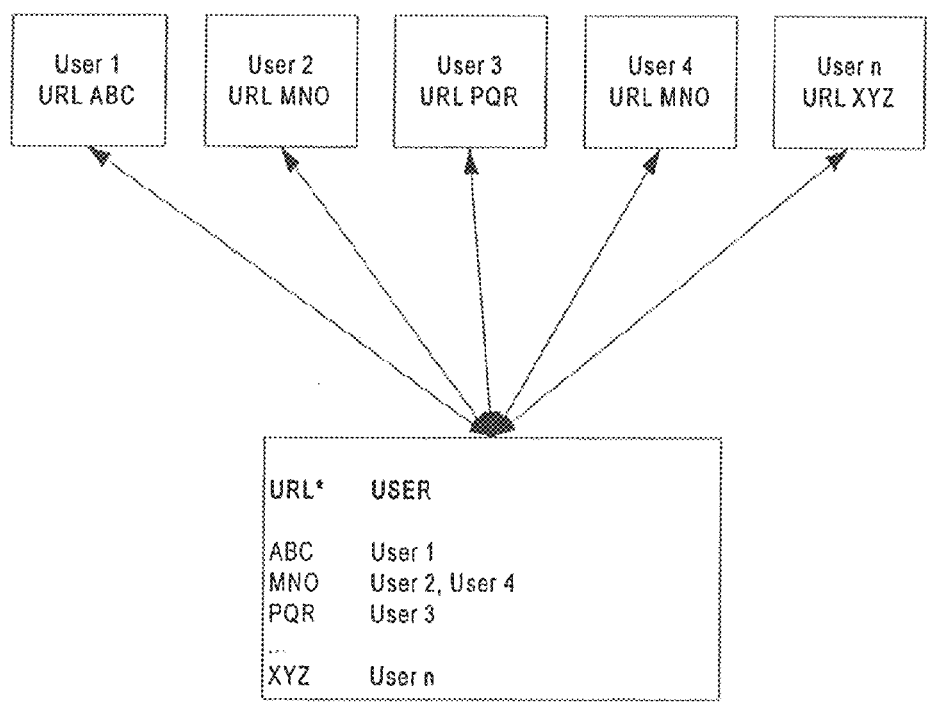
FIG. 5 is an exemplary illustration of a scalable data table structure, according to an embodiment of the invention.

FIG. 4 depicts a general, graphical example of viewable distances for four or more users (User 1, User 2, User 3, User 4, ... User n), while FIG. 5 is an illustration of an exemplary, scalable table structure for URL storage. As recited above, the URL table structure may be stored in the one or more databases (170a, 170b ... 170n), as shown in FIGS. 1 and 3.

According to an embodiment of the invention, the virtual distance may represent a metric on the domain of Uniform Resource Identifiers (URIs). Although the terms "URL" and "URI" may be used herein interchangeably, those skilled in the art will recognize that "URI" is the generic term for all types of names and addresses that refer to objects on the WWW, and that a URL is one kind of a URI. In one implementation, distance mapping module 136 may utilize a distance metric which may comprise any partial metric computed from web-accessible information. Such metrics are used, for example, in search engines to provide a "similar pages" feature (e.g., Google) or "more like this" feature (Autonomy), wherein the cognitive similarity of words or phrases appearing on a page are used to recognize pages with similar content. The invention is not limited to distance metrics based on cognitive similarity, however. Other distance mapping techniques may be equally useful.

As an alternative example, distance mapping module 136 may compute another distance metric based on the URIs of web pages visited by users, without regard to content of the pages. According to an embodiment, the standard components of a received URI may be directly compared to the standard components of a stored URI, and the hierarchical depth at which they differ interpreted as the inverse of their distance. Identical addresses may, for example, be assigned a distance of "0." If schemes are different, such as when an http: URI is compared to an ftp: URI, or when either URI is opaque, such as nntp: or mailto: URIs, the distance may be interpreted to be a value sufficiently large as to be outside of a configured threshold. If both URIs are hierarchical, but the authorities (servers) are different, the distance may be some arbitrary number, greater than unity. If the authorities (servers) are the same, the distance may, according to one embodiment, be computed as $2^{-i}$, where "i" is the index of the first character at which the URL paths differ. An example of this is illustrated in FIG. 6. The data illustrated in FIG. 6 may be stored in the one or more databases (170a, 170b, ... 170n) as shown in FIGS. 1 and 3.

According to alternative embodiments, distance mapping module 136 may also determine the distance between URLs based on: 1) the number of links between web pages or websites; 2) the frequency of occurrence of similar important terms on pages; or 3) the length of the shortest path of hyperlinks between pages. Other techniques may be used.

The various features and functions enabled by application 130 will now be discussed with reference to the views illustrated in FIGS. 7-8. It should be understood that these views are exemplary and may differ in appearance, content, and configuration. Further, and as may be described herein, the terms "button," "pull-down" or "drop-down menu," "tab," "click-box," "check-box," "hypertext link," and "hot link," are each particular examples of a generic "selection portion" which may comprise any known navigational tool that enables users to select, access, display, or navigate through the various views, portions, or modules of application 130. The selection portions may be accessed using any known input device associated with terminals (110, 112, 114) such as, for example, a keyboard, computer mouse, light stylus instrument, or finger or other body part in a touch-screen implementation.

While a selection portion may be described and illustrated as a button in one embodiment, it could comprise a different selection portion (e.g., a check-box) in an alternative embodiment. These selection portions may be present in addition to the various navigational tools that may be unique to, or associated with, a web browser (e.g., AOL™, Netscape™) or other GUI 150 used to access application 130.

Figure 7:
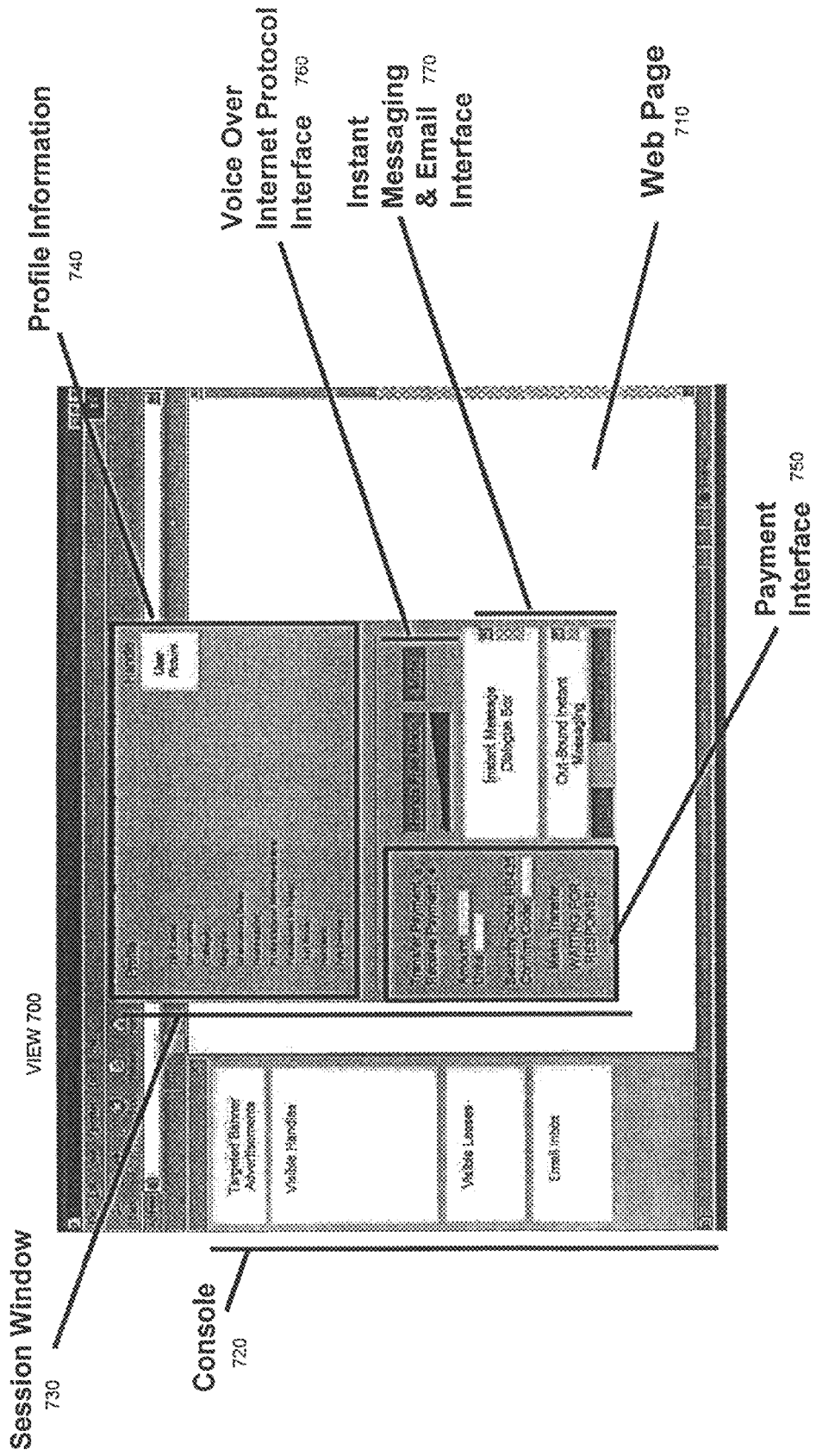
FIG. 7 illustrates an exemplary view that may be displayed to a user, according to an embodiment of the invention.
Figure 8:
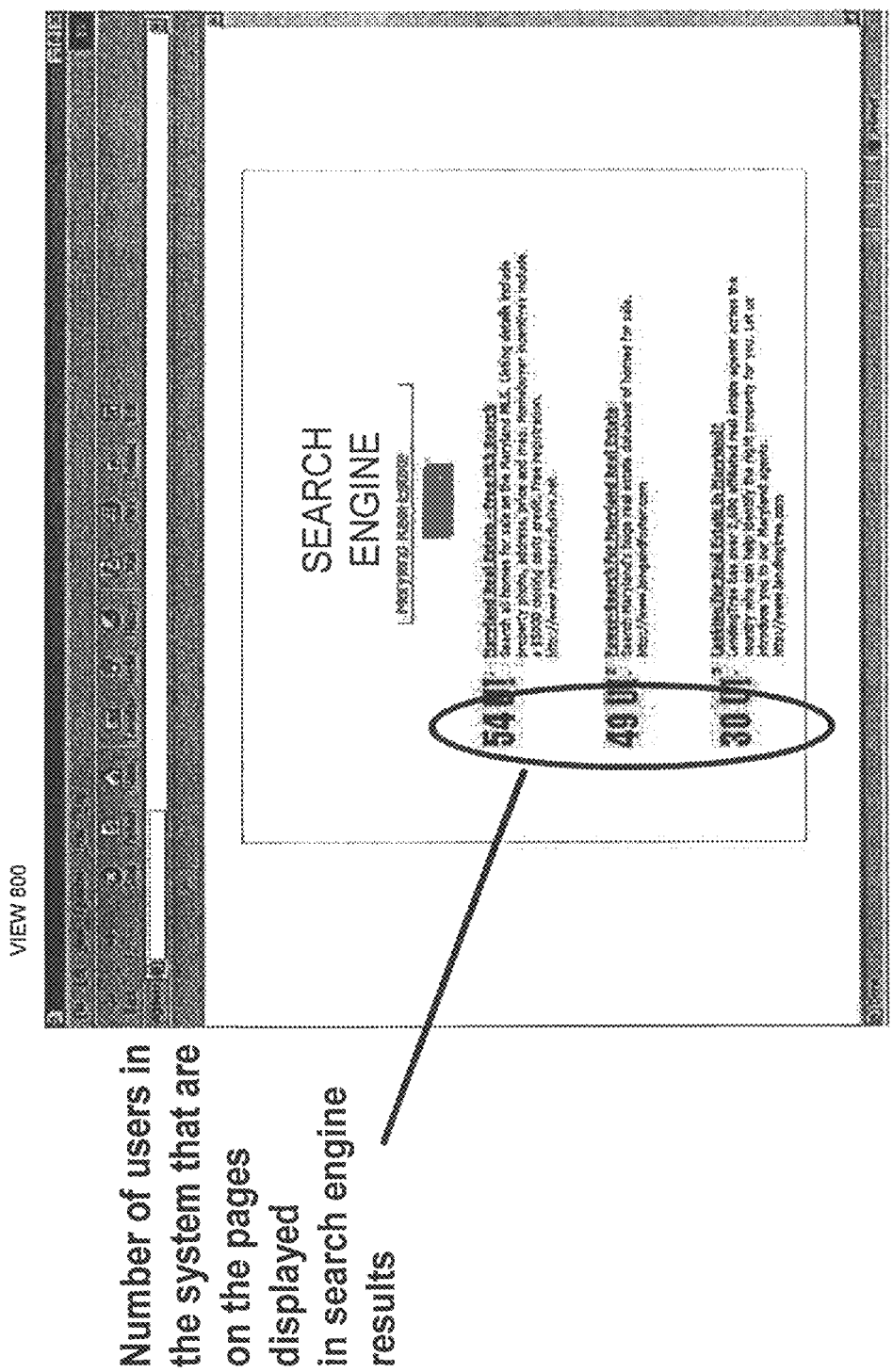
FIG. 8 illustrates an exemplary view that may be displayed to a user, according to an embodiment of the invention.

FIG. 7 is an illustration of an exemplary view 700 that may be displayed to a user via a web browser (e.g., GUI 150), according to an embodiment of the invention. As depicted in view 700, web page 710 may be displayed to the user together with an additional "window" or display portion referred to herein as a console 720. As recited above, when a user first access web page 710 using their browser, the URL address of web page 710 may be transmitted to monitoring module 134 of application 130. Distance mapping module 136 may then, based on the information received by monitoring module 134, compute the location's virtual distance from that of one or more other registered users (using any one or more of the techniques described above), and select for transmission back to the user the handles (or identities) of those users whose URL's place them within a virtual distance from the user that is less than (or equal to) a configured threshold. Console 720 may then display the handles (or identities) of the identified "nearby" users. This process may be repeated as a user visits each new web site or page during a particular user session.

When viewing a displayed list of "nearby" handles in console 720, a user may request additional information about one or more listed handles. For example, a user may access a profile for a given handle to determine additional information about the user associated with the handle, such as a ranking based on the frequency with which they accept or reject requests to communicate.

According to an embodiment of the invention, console 720 may also visually depict similarities or affinities between nearby users. The affinity information may be used, for instance, to filter a list of handles so as to provide a more manageable view of very heavily populated portions of the virtual space. The similarities or affinities may be determined by a number of metrics including, but not limited to: 1) statistical similarity of user profile attributes (demographics); 2) statistical similarity of self-described interest attributes; 3) similarity of opinions indicated by votes cast on some subject (e.g., as in collaborative filtering techniques); 4) a comparison of browser histories as well as current locations; 5) the frequency with which the users have communicated in the past; 6) number of accepted and/or denied requests to communicate; 7) statistical similarity of third-party attribute data or behavior profiles; and/or 8) relationships indicated between persons in a directory (e.g., degrees of separation, social networking). Other metrics may be utilized.

Console 720 may further display an e-mail message inbox and/or a listing of visible leases. According to an embodiment of the invention, a user may (for a fee, for other consideration, or in some implementations for no additional fee) request to have his or her handle associated with a particular web page, such that their handle will be displayed on the console 720 of any individual that happens to access the web page, regardless of whether the "leasing" user is currently viewing the web page or not. The ability to associate one's handle with a web page and thus "lease" a space on the console 720 of individuals accessing that page has beneficial commercial advantages. For example, a user that teaches guitar lessons may request to have his handle associated with a web site or web page relating to guitars (e.g., http://www.guitar-aficionado.com) such that his handle will appear on the console 720 of any user accessing the site. This exposure may lead to the user obtaining more students for guitar instruction. Other advantages exist.

According to one embodiment, a user may opt to initiate a communication with one or more of the "nearby" handles displayed in the list in console 720 after reviewing their associated profiles. A user may "double-click" on, "right-click" on, or otherwise affirmatively select a provided selection portion associated with a handle to launch a session window 730. Session window 730 may comprise a profile information display 740 for the selected handle, an instant-messaging and e-mail interface 770, a voice over internet protocol (VoIP) interface 760, and a payment interface 750. Other interfaces or displays may be provided in session window 730.

According to an embodiment of the invention, profile information display 740 may include any information about a handle including, but not limited to, a picture, contact information, education information, profession, publications, likes, dislikes, credit-card or other financial information, preferred retailers, interests, hobbies, books read, pets, demographic information, etc.

Session window 730 may further comprise an instant-messaging and e-mail interface 770 that may facilitate communication between a user and a "targeted" or intended handle without requiring the participation of the website that the user and handle are viewing. This functionality may be enabled by either communications module 138 of application 130 (FIG. 1) or an equivalent communications module load on to the user's terminal. According to one embodiment, if the profiles for the user and intended handle indicate that they each share a common instant messaging (IM) client, instant-messaging and e-mail interface 770 may comprise a chat window for each user's client, connected to the appropriate screen names.

According to one embodiment, the aforementioned communications module may provide a "lowest common denominator" tool to facilitate communications between users who would otherwise have no means to communicate. Additionally, if the operators of the viewed web pages choose to participate, they may interface with the communications module to offer additional value to users.

According to an embodiment of the invention, VoIP interface 760 may enable a user to contact an intended handle via a VoIP client. VoIP technology is well known and includes a variety of connection techniques. If both parties have compatible client-side VoIP software, they may use this software to communicate directly through their respective client terminals via the Internet without having to go through a telephone switch. If only the caller (sender) has the VoIP software, the call may be routed through the Internet and the conventional packet switched telephone network (typically incurring an additional fee). This functionality may be enabled by either communications module 138 of application 130 (FIG. 1) or via communications modules (IM, VoIP, etc.) that may be included with the software downloaded to or installed on user terminals, or installed separately as console plug-ins or even independent applications with appropriate programming interfaces for interoperability.

As recited above, session window 730 may further comprise a payment interface 750 for enabling users to exchange money or other forms of payment (such as frequent flyer miles, affinity program points, etc.). A user may initiate a transaction, which may be displayed to a second user for approval. If both users indicate agreement, the payment may be deducted from one user's account and credited to the other's. This functionality may be enabled by either transaction module 142 of application 130 (FIG. 1) or via a transaction module that may be included with the software downloaded to, or installed on, each user's terminal.

According to an embodiment of the invention, search module 140 of application 130 (see FIG. 1) may provide registered users with search capabilities similar to those of common search engines, but augmented with the application's knowledge of the locations on the web of other registered users. View 800 depicted in FIG. 8, for example, illustrates the results of a search query (e.g., a listing of web pages) together with a visual indication or display of the number of registered users currently viewing those particular web pages. This additional data may be used by a user to rank and/or filter the query results.

According to another aspect of the invention, the application may enable users to be associated with particular web pages such that they appear to other users as if viewing the page, even when they are not actively viewing the page. For example, a music teacher that is not currently on the Internet or that is on another website may want to always be available for communication with users visiting a jazz website, knowing each visitor is a potential student. Other features may be provided.

Figure 9:
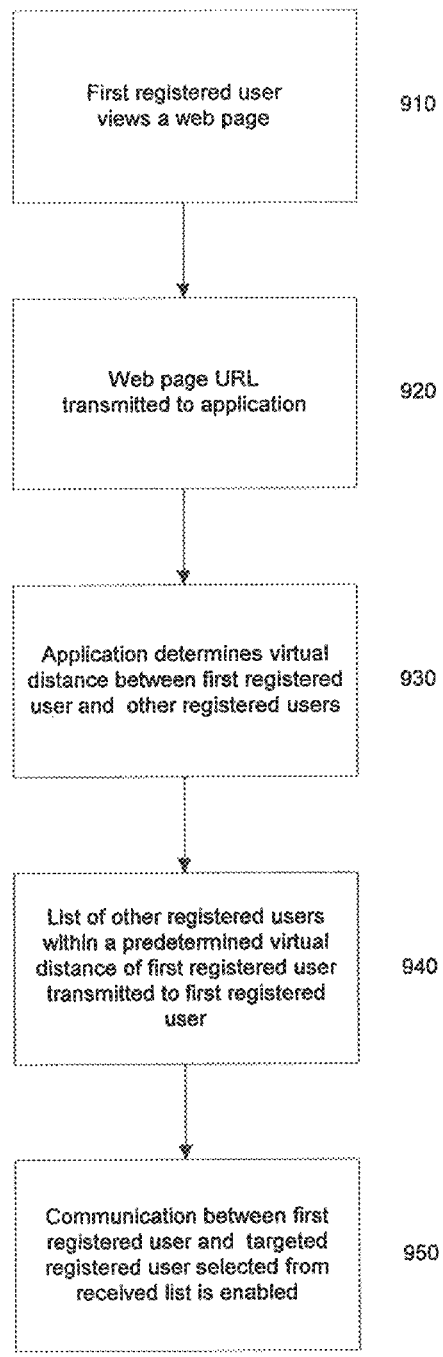
FIG. 9 illustrates a flowchart of processing according to the invention, in one regard.

In addition to the foregoing description, FIG. 9 illustrates a flowchart of one method of processing, according to the invention, in one regard. The following operations may be accomplished using all or some of the of the system components described in detail above, and may incorporate all of the features and functionality of the invention as set forth in the foregoing description and accompanying drawing FIGS. 1-8.

According to an embodiment of the invention, a user wishing to identify and communicate with other Internet users having similar interests may access an on-line application and complete a registration process. In an operation 910, a first registered user may, during an on-line web browsing session, view a web page. In an operation 920, each time the first registered user browses to a new web page, a software download (or browser plug-in) loaded on the user's terminal may transmit the Uniform Resource Locator (URI) address of the current web page to the on-line application. The on-line application may, in an operation 930, compute the virtual distance from the received URL to the locations of one or more other registered users, using any of the techniques described in detail above.

In an operation 940, a list of registered users falling within a predetermined virtual distance from the first registered user is transmitted (and displayed) to the first registered user. In an operation 950, communication between the first registered user and any one or more registered users selected from the received list may be enabled.

Although the foregoing description and accompanying drawing figures relate to exemplary embodiments for enabling Internet users to identify and communicate with other Internet users having similar interests (e.g., viewing identical or similar web pages), the invention should not be so limited. The features and functionality of the invention as described herein may also be extended to other network-based applications. As an example, a user may access an organization's file management system via a LAN to view or edit one or more data objects (e.g., a word-processing document, a spreadsheet, MS PowerPoint presentation, etc.), or to browse folders or other data objects in a common, shared network drive. When a user accesses a data object (e.g., right-clicking on the object, or launching an application that supports the object), a window or view similar to console 720 (FIG. 7) may appear on the user's GUI listing the user I.D.'s or "handles" of other users that are currently viewing or editing (or have recently viewed or edited) the data object, or related or similar data objects.

For instance, a user may open a Microsoft Word document, and a window or view similar to console 720 (FIG. 7) may appear or "pop-up" in Microsoft Word presenting a listing of handles, as described above. The listing of handles may identify other users that are viewing or editing (or have recently viewed or edited) that document or a related document (e.g., a power point presentation associated with the Word document). Related documents or data objects may be identified by similarity of file name (e.g., "XYZ-business-plan.doc" and "XYZ-investor-presentation.ppt"), by location in the same folder (e.g., N:/XYZ), or via other techniques. The listing of handles may be determined using any one or more of the distance mapping techniques described in detail above. The user may then contact one of the listed handles to discuss the data object using any of the techniques described in detail above.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for enabling identification and ranking of network users to facilitate communication and commerce between them, the method comprising:
    providing a server having a distance calculating module operating thereon;
    using the distance calculating module, calculating one or more virtual distances between a first resource identified by a uniform resource identifier and one or more other resources identified by one or more other uniform resource identifiers,
    wherein the first resource identified by a resource identifier that the user is accessing and each of the one or more other resources identified by one or more other uniform resource identifiers accessed by other users comprise any resource identified by a resource identifier on any network, and
    wherein each of the one or more virtual distances is a non-negative real number representing a comparison of relevant properties derived from the first resource identified by a uniform resource identifier and the one or more other resources identified by one or more other uniform resource identifiers;
    generating a listing of at least one of the one or more other resources identified by one or more other uniform resource identifiers ranked by virtual distance and determined to be within a predetermined virtual distance from the first resource identified by a uniform resource identifier; and
    enabling a first user associated with the first resource identified by a uniform resource identifier to communicate with one or more other users associated with the at least one of the one or more other resources identified by one or more other uniform resource identifiers from the generated listing.

2. The method of claim 1, wherein the relevant properties derived from the first resource identified by a uniform resource identifier and the one or more other resources identified by one or more other uniform resource identifiers include words or phrases of cognitive similarity.

3. The method of claim 1, wherein the first resource identified by a uniform resource identifier and the one or more other resources identified by one or more other uniform resource identifiers include information relating to broadcast digital content.

4. The method of claim 1, wherein generating the listing of at least one of the one or more other resources identified by one or more other uniform resource identifiers further comprises configuring the listing for display by a graphical user interface and ranked by a virtual distance expressed graphically or in a text table.

5. The method of claim 4, wherein the graphical user interface comprises a web browser application, television screen or mobile phone application.

6. The method of claim 1, further comprising enabling the first user to access profile data associated with at least one of the one or more other users.

7. The method of claim 1, wherein enabling the first user to communicate with the one or more other users further comprises enabling the first user to send a digital communication to at least one of the one or more other users.

8. The method of claim 1, further comprising enabling the first user to execute a search query against a search engine.

9. The method of claim 8, wherein results of the search query comprise a listing of one or more uniform resource identifiers, and wherein each of the one or more uniform resource identifiers is displayed with an associated visual indicator identifying how many users are currently associated with each of the one or more uniform resource identifiers.

10. The method of claim 1, wherein the method comprises tracking the virtual location of the first user and each of the one or more other users anywhere on a network.

11. The method of claim 1, wherein the distance calculating module derives the non-negative real numbers by comparing information relating to the first resource identified by a uniform resource identifier with information relating to each of the one or more other resources identified by a uniform resource identifier.

12. The method of claim 1, wherein the distance calculating module assigns a non-negative real number to the first resource identified by a uniform resource identifier and to each of the one or more other resources identified by one or more other uniform resource identifiers based on comparing information relating to the first resource identified by a uniform resource identifier with information relating to each of the one or more other resources identified by one or more other uniform resource identifiers.

13. The method of claim 12, wherein the information relating to the first resource identified by a uniform resource identifier and the information relating to each of the one or more other resources identified by one or more other uniform resource identifiers is selected from the group consisting of website domain addresses, web page uniform resource identifiers, internet protocol addresses, words, word counts, user profile information, user settings and past values of this information.

14. The method of claim 1, wherein the distance calculating module ranks the one or more other resources identified by one or more other uniform resource identifiers based on the non-negative real numbers.

15. The method of claim 14, wherein the ranking of the one or more other resources identified by one or more other uniform resource identifiers changes in real time as the user and the one or more other resources identified by one or more other uniform resource identifiers change.

16. The method of claim 1, wherein the lower the non-negative real number, the more conceptually similar a uniform resource identifier of the one or more other resources identified by one or more other uniform resource identifiers is to the first resource identified by a uniform resource identifier.

17. The method of claim 1, wherein the higher the non-negative real number, the less conceptually similar a uniform resource identifier of the one or more other resources identified by one or more other uniform resource identifiers is to the first resource identified by a uniform resource identifier.

18. The method of claim 1, wherein the non-negative real number is zero when the user and one or more other users are associated with the same uniform resource identifier.

19. The method of claim 1, wherein calculating a virtual distance requires at least two resources identified by one or more other uniform resource identifiers.

20. The method of claim 1, wherein calculating one or more virtual distances includes converting relevant information provided by the one or more resources identified by one or more other uniform resource identifiers to a value.

21. The method of claim 20, wherein the one or more other resources identified by one or more other uniform resource identifiers are ranked based on the value of each of the one or more resources identified by one or more other uniform resource identifiers.

22. The method of claim 20, wherein the value of the each of the one or more other resources identified by one or more other uniform resource identifiers represents the virtual distance between the first resource identified by a uniform resource identifier and each of the one or more other resources identified by one or more other uniform resource identifiers.

23. The method of claim 1, wherein the method yields a symmetrical relationship between any two users such that the virtual distance from user A to user B is the same as the distance from user B to user A and the distance from user A to user B plus the distance from user B to user C can never be less than the direct distance from user A to user C.

24. A system for enabling identification and ranking of network users to facilitate communication and commerce between them, the system comprising:
a server having a distance calculating module operating thereon for calculating one or virtual distances between a first resource identified by a uniform resource identifier and one or more other resources identified by one or more other uniform resource identifiers,
wherein each of the one or more virtual distances is a non-negative real number representing a comparison of relevant properties derived from the first resource identified by a uniform resource identifier and the one or more other resources identified by one or more other uniform resource identifiers,
wherein the server generates a listing of at least one of the one or more other resources identified by one or more other uniform resource identifiers ranked by virtual distance and determined to be within a predetermined virtual distance from the first resource identified by a uniform resource identifier;
a communications module operable on the server enabling the user to communicate with one or more of the other users from the generated listing; and
a transaction module operable on the server enabling the user to participate in commerce with the one or more other users from the generated listing.

25. The system of claim 24, wherein the system comprises means for determining the presence of one or more other users at or near the first resource identified by a uniform resource identifier.

26. The system of claim 24, wherein the system comprises means for tracking the virtual location of the first user and each of the one or more other users anywhere on a network.

27. A method for enabling identification and ranking within a network of a first user having interests similar to those of a second user and facilitating communication and commerce between the first user and the second user, the method comprising:
providing a server having a distance calculating module operating thereon; and
using the distance module, calculating a virtual distance between a first uniform resource identifier associated with the first user and a second uniform resource identifier associated with the second user,
wherein the virtual distance is a non-negative real number representing a comparison of relevant properties derived from the first resource identified by a uniform resource identifier and the second uniform resource identifier, and
wherein upon the second resource identified by a uniform resource identifier being determined to be within a predetermined virtual distance of the first resource identified by a uniform resource identifier, the first user may communicate with the second user.

28. A method for enabling identification and ranking of network users having similar characteristics and facilitating communication and commerce between them, the method comprising:
providing a server having a distance calculating module operating thereon;
using the distance calculating module, calculating one or more virtual distances between a first resource identified by a uniform resource identifier and one or more other resources identified by one or more other uniform resource identifiers,
wherein each of the one or more virtual distances is a non-negative real number representing a comparison of relevant properties derived from the first resource identified by a uniform resource identifier and the one or more other resources identified by one or more other uniform resource identifiers; and generating a list of at least one of the one or more other resources identified by one or more other uniform resource identifiers ranked by the virtual distance between the first resource identified by a uniform resource identifier and the one or more other resources identified by one or more other uniform resource identifiers.

29. The method of claim 28, wherein the list of at least one of the one or more other resources identified by one or more other uniform resource identifiers is ranked in order of nearest to furthest virtual distance from the first resource identified by a uniform resource identifier.

* * * * *